United States Patent
Huang (10) Patent No.: US 12,331,840 B2
(45) Date of Patent: Jun. 17, 2025

(54) INTEGRATED AIR INLET AND OUTLET VALVE AND PRESSURE SWING ADSORPTION AIR PATH SYSTEM

(71) Applicant: HUNAN ZOY TECHNOLOGY CO., LTD., Changsha (CN)

(72) Inventor: Gang Huang, Changsha (CN)

(73) Assignee: HUNAN ZOY TECHNOLOGY CO., LTD., Changsha (CN)

( * ) Notice: Subject to any disclaimer, the term of this patent is extended or adjusted under 35 U.S.C. 154(b) by 0 days.

(21) Appl. No.: 18/010,093

(22) PCT Filed: May 31, 2022

(86) PCT No.: PCT/CN2022/096300
§ 371 (c)(1),
(2) Date: Dec. 13, 2022

(87) PCT Pub. No.: WO2023/109023
PCT Pub. Date: Jun. 22, 2023

(65) Prior Publication Data
US 2024/0240722 A1     Jul. 18, 2024

(30) Foreign Application Priority Data

Dec. 17, 2021    (CN) .......................... 202111552226.9

(51) Int. Cl.
*B01D 53/047*      (2006.01)
*B01D 53/04*       (2006.01)
(Continued)

(52) U.S. Cl.
CPC .......... *F16K 11/22* (2013.01); *B01D 53/0423* (2013.01); *B01D 53/0446* (2013.01);
(Continued)

(58) Field of Classification Search
CPC .. F16K 11/22; F16K 27/0263; F16K 31/1223; F16K 11/048; B01D 53/0423;
(Continued)

(56) References Cited

U.S. PATENT DOCUMENTS 4,162,146 A *    7/1979   Seibert ............... B01D 53/0446
                                                                          96/113
4,941,894 A      7/1990   Black
(Continued)

FOREIGN PATENT DOCUMENTS

CN          107051113 A      8/2017
CN          107366763 A     11/2017
(Continued)

*Primary Examiner* — Frank M Lawrence, Jr.
(74) *Attorney, Agent, or Firm* — The Webb Law Firm (57) ABSTRACT

An integrated air inlet and outlet valve and a pressure swing adsorption air path system including the same are disclosed. The integrated air inlet and outlet valve includes a valve body with an air inlet, an air outlet, an exhaust port, a first blowback air inlet and two air path control units. The air path control unit includes a first air inlet and outlet port connected with the air outlet through a first one-way valve and a second air inlet and outlet port selectively communicated with the air inlet or the exhaust port through a first control valve, the exhaust port is provided with an on-off control mechanism, the first blowback air inlet is respectively connected with the first air inlet and outlet port of each air path control unit through a second one-way valve, and the valve body is further provided with a pressure equalization control assembly.

17 Claims, 11 Drawing Sheets

(51) Int. Cl.
*F16K 11/22* (2006.01)
*F16K 27/02* (2006.01)
*F16K 31/122* (2006.01)

(52) U.S. Cl.
CPC ........ *B01D 53/047* (2013.01); *F16K 27/0263* (2013.01); *F16K 31/1223* (2013.01); *B01D 2256/12* (2013.01); *B01D 2257/102* (2013.01); *B01D 2258/06* (2013.01); *B01D 2259/402* (2013.01)

(58) Field of Classification Search
CPC .. B01D 53/04; B01D 53/0446; B01D 53/047; B01D 2256/12; B01D 2257/102; B01D 2258/06; B01D 2259/402; B01D 2259/40003; B01D 53/0407; F17D 1/04; F17D 3/01
USPC ...... 96/121, 130, 133, 143, 144; 95/96, 117, 95/130
See application file for complete search history.

(56) References Cited

U.S. PATENT DOCUMENTS

| | | | | |
|---|---|---|---|---|
| 5,578,115 | A | * | 11/1996 | Cole ................. B01D 53/0446 96/151 |
| 5,604,991 | A | * | 2/1997 | Castle ................. B01D 53/261 34/80 |
| 5,827,358 | A | * | 10/1998 | Kulish ............... B01D 53/0407 96/144 |
| 2013/0061755 | A1 | * | 3/2013 | Frederick ........... B01D 53/0446 96/110 |
| 2021/0102638 | A1 | * | 4/2021 | Fulton ................ F16K 31/1225 |
| 2024/0226797 | A1 | * | 7/2024 | Huang .................... F16K 11/22 |

FOREIGN PATENT DOCUMENTS

| | | |
|---|---|---|
| CN | 108136313 A | 6/2018 |
| CN | 114046455 A | 2/2022 |
| EP | 0039504 A1 | 11/1981 |
| WO | 2018178661 A1 | 10/2018 |
| WO | 2019201631 A1 | 10/2019 |

* cited by examiner

FIG. 1

PRIOR ART

INTEGRATED AIR INLET AND OUTLET VALVE AND PRESSURE SWING ADSORPTION AIR PATH SYSTEM

CROSS-REFERENCE TO RELATED APPLICATIONS

This application is the United States national phase of International Application No. PCT/CN2022/096300 filed May 31, 2022, and claims priority to Chinese Patent Application No. 202111552226.9 filed Dec. 17, 2021, the disclosures of which are hereby incorporated by reference in their entirety.

BACKGROUND

Technical Field

The disclosure relates to the technical field of compressed air purifying devices, in particular to an integrated air inlet and outlet valve and a pressure swing adsorption air path system.

Technical Description

Figure 1:
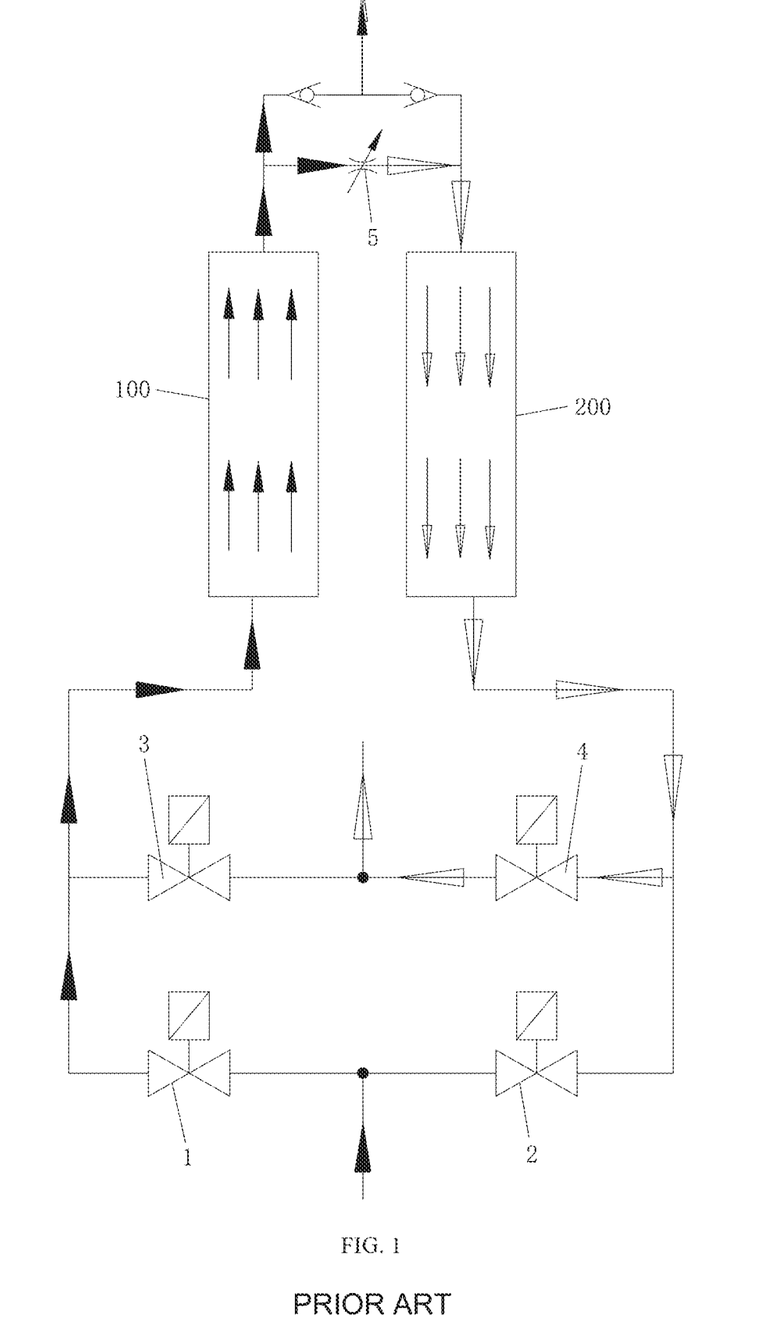
FIG. 1 is a schematic diagram of an existing pressure swing adsorption air path system.

In the field of compressed air purifying, it is often necessary to have the reversing function of air intake and exhaust due to special air intake requirements. For example, FIG. 1 shows a typical pressure swing adsorption air path system used in an existing compressed space purifying treatment device. The working process and principle of this pressure swing adsorption oxygen-making air path system are described as follows. A first solenoid valve 1 and a fourth solenoid valve 4 cooperate with each other to form a first air path loop, and a second solenoid valve 2 and a third solenoid valve 3 cooperate with each other to form a second air path loop. When the first adsorption tower 100 is working, the second solenoid valve 2 and the third solenoid valve 3 are turned off, while the first solenoid valve 1 and the fourth solenoid valve 4 are turned on, and an air source enters the first adsorption tower 100 through the first solenoid valve 1. The first adsorption tower 100 is filled with adsorbent, and most of the purified air enters downstream and is supplied to an air consuming device, and a small part (about 16% to 20%) enters the second adsorption tower 200 through a throttle valve 5 (an air pressure after passing through the throttle valve 5 is approximately equal to an atmospheric pressure) to blow back (or analyze and regenerate) impurity air trapped in the adsorbent in last cycle. After the blowback air passes through the second adsorption tower 200, tail air is exhausted through the fourth solenoid valve 4. When the second adsorption tower 200 is working, the first solenoid valve 1 and the fourth solenoid valve 4 are turned off, while the second solenoid valve 2 and the third solenoid valve 3 are turned on, and the air source enters the second adsorption tower 200 through the second solenoid valve 2. The second adsorption tower 200 is filled with adsorbent, and most of the purified air enters downstream and is supplied to an air consuming device, and a small part (about 16% to 20%) enters the first adsorption tower 100 through the throttle valve 5 (the air pressure after passing through the throttle valve 5 is approximately equal to the atmospheric pressure) to blow back (or analyze and regenerate) the impurity air trapped in the adsorbent in last cycle. After the blowback air passes through the first adsorption tower 100, the tail air is exhausted through the third solenoid valve 3. The first air path loop and the second air path loop work alternately, so that the air source alternately passes through the first adsorption tower 100 and the second adsorption tower 200 for purification, and meanwhile, when one adsorption tower is working, the other adsorption tower is supplied with the blowback air for adsorbent regeneration.

In order to avoid the influence of sudden pressure change on the downstream air consuming device and slow down the pulverization of the adsorbents in the first adsorption tower 100 and the second adsorption tower 200 due to the sudden pressure change, a pressure equalization stage will be added to the inlet air before the first adsorption tower 100 and the second adsorption tower 200 are switched: after the adsorbent in the second adsorption tower 200 is fully regenerated, the fourth solenoid valve 4 is turned off in advance, so that the pressure in the second adsorption tower 200 is gradually increased from normal pressure to working pressure, then the first solenoid valve 1 is turned off, and meanwhile, the second solenoid valve 2 and the third solenoid valve 3 are turned on.

However, in the existing pressure swing adsorption air path system, all valves are connected by pipelines, which is cumbersome and inconvenient to install and maintain. Moreover, each adsorption tower is a container with a bottom inlet and an upper outlet, that is, the air inlet end and the air outlet end of the adsorption tower are respectively arranged at upper and lower ends of the adsorption tower. In order to match this air inlet and outlet structure and mode, the air inlet end and the air outlet end of an air dryer also need to be distributed at opposite ends of the adsorption tower, which will increase the overall height of the compressed air treatment device, resulting in large device volume and much occupied space.

SUMMARY

A technical problem to be solved by the disclosure is to overcome the shortcomings of the existing technology, provide an integrated inlet and outlet valve which can greatly reduce connecting pipelines, is simple and convenient to install and maintain, compact in structure, occupies less space, has low manufacturing cost and low failure rate, and also correspondingly provide a pressure swing adsorption air path system adopting the integrated inlet and outlet valve.

In order to solve the foregoing technical problems, the disclosure employs the following technical solutions:

An integrated air inlet and outlet valve includes a valve body, the valve body is provided with an air inlet, an air outlet, an exhaust port, a first blowback air inlet and two air path control units, the air path control unit includes a first air inlet and outlet port and a second air inlet and outlet port, the first air inlet and outlet port is connected with the air outlet through a first one-way valve which enables air to flow to the air outlet from the first air inlet and outlet port in one direction only, the second air inlet and outlet port is selectively communicated with the air inlet or the exhaust port through a first control valve, the exhaust port is provided with an on-off control mechanism, the first blowback air inlet is respectively connected with the first air inlet and outlet port of each air path control unit through a second one-way valve which enables air to flow to the first air inlet and outlet port from the first blowback air inlet in one direction only, and the valve body is further provided with a pressure equalization control assembly capable of controlling the air outlet and the first blowback air inlet to be mutually connected and disconnected.

In the integrated air inlet and outlet valve above, preferably, the first control valve includes a first valve housing, a first piston mounted in the first valve housing, a first valve sheet connected with the first piston and a first driving assembly configured for driving the first piston to reciprocate linearly, the first valve housing is detachably installed in an inner cavity provided in the valve body and defines a first ventilation cavity, the first ventilation cavity is provided with a first valve port communicated with the second air inlet and outlet port, a second valve port communicated with the air inlet and a third valve port communicated with the exhaust port, the first valve sheet is located in the first ventilation cavity and is capable of being driven by the first piston reciprocating linearly to selectively seal the second valve port or the third valve port.

In the integrated air inlet and outlet valve above, preferably, the valve body is further provided with a second blowback air inlet connected in parallel with the first blowback air inlet to a blowback air source, the second blowback air inlet is connected with the exhaust port through a second control valve, and the second control valve is configured for controlling connection/disconnection of the second blowback air inlet with the exhaust port.

In the integrated air inlet and outlet valve above, preferably, the second control valve includes a second valve housing, a second piston mounted in the second valve housing, a second valve sheet connected with the second piston and a second driving assembly configured for driving the second piston to reciprocate linearly, the second valve housing is detachably installed in the inner cavity provided in the valve body and defines a second ventilation cavity, the second ventilation cavity is provided with a fourth valve port, a fifth valve port and a sixth valve port communicated with the second blowback air inlet, the third valve port is communicated with the exhaust port through the fourth valve port, the second ventilation cavity and the fifth valve port in turn, the second valve sheet is located in the second ventilation cavity and is capable of being driven by the second piston reciprocating linearly to selectively seal the fourth valve port or the sixth valve port, and the second control valve is further used as the on-off control mechanism of the exhaust port.

In the integrated air inlet and outlet valve above, preferably, the valve body is provided with a first hole, a second hole and a third hole extending from outside of the valve body to inside of the valve body, the valve body is provided with plugs for plugging ends of the first hole, the second hole and the third hole, the third hole is communicated with the first hole and the second hole, the first hole and the second hole are respectively communicated with the first ventilation cavities of the two air path control units correspondingly, a communication port of the first hole and the second hole with the first ventilation cavity is used as the third valve port of the corresponding air path control unit, the third hole is communicated with the second ventilation cavity, and a communication port of the third hole with the second ventilation cavity is used as the fourth valve port.

In the integrated air inlet and outlet valve above, preferably, the valve body is provided with a first channel and a second channel extending across the valve body and arranged side by side, two sealing plates which seal two ends of the first channel and the second channel are detachably mounted on the valve body, the valve body is provided with a fourth hole and a fifth hole extending from outside of the valve body to inside of the valve body, the fourth hole and the fifth hole are respectively used as the first air inlet and outlet ports of the two air path control units, the fourth hole is communicated with one ends of both the first channel and the second channel, and the fifth hole is communicated with the other ends of both the first channel and the second channel; the first one-way valves of the two air path control units are mounted in the first channel between the fourth hole and the fifth hole at an interval, the first channel between the first one-way valves of the two air path control units is used as a first shared cavity, the air outlet is communicated with the first shared cavity, the second one-way valves of the two air path control units are mounted in the second channel between the fourth hole and the fifth hole at an interval, the second channel between the second one-way valves of the two air path control units is used as a second shared cavity, and the first blowback air inlet is communicated with the second shared cavity.

In the integrated air inlet and outlet valve above, preferably, the pressure equalization control assembly includes a ventilation channel connecting the air outlet and the first blowback air inlet, and the valve body is provided with a throttle valve located in the ventilation channel and an on-off control valve for controlling on-off of the ventilation channel.

In the integrated air inlet and outlet valve above, preferably, the exhaust port is provided with a muffler and a water outlet.

As a general technical concept, the disclosure further provides a pressure swing adsorption air path system, including two adsorption towers, the adsorption tower having two air inlet and outlet ends, and further including the integrated air inlet and outlet valve above, wherein the first air inlet and outlet ports and the second air inlet and outlet ports of the two air path control units in the integrated air inlet and outlet valve are respectively connected with the two air inlet and outlet ends of the two adsorption towers correspondingly.

In the pressure swing adsorption air path system above, preferably, the two air inlet and outlet ends of the adsorption tower are located at the same end of the adsorption tower.

Compared with the existing technology, the disclosure has the following advantages.

In the integrated inlet and outlet valve of the disclosure, the first one-way valves, the second one-way valves, the first control valves and the on-off control mechanisms of the two air path control units are integrally installed on the valve body. Therefore, when the integrated inlet and outlet valve is used in the pressure swing adsorption system, the integrated air inlet and outlet valve has the advantages of greatly reduced connecting pipelines which avoids the problem of redundant pipeline connections, simple installation and maintenance, reduced failure rate, and good aesthetics. Moreover, the integrated inlet and outlet valve has small overall size and small occupied space, which is beneficial to reducing the manufacturing cost. Meanwhile, the integrated air inlet and outlet valve realize the functions of air inlet, air outlet and pressure equalization, and can meet the requirements of the pressure swing adsorption air path system.

The pressure swing adsorption air path system of the disclosure also has the advantages of the integrated air inlet and outlet valve because of adopting the integrated air inlet and outlet valve of the disclosure.

REFERENCE NUMERALS 1 refers to valve body; 11 refers to air inlet; 12 refers to air outlet; 13 refers to exhaust port; 14 refers to first blowback air inlet; 15 refers to second blowback air inlet; 21 refers to first air inlet and outlet port; 22 refers to second air inlet and outlet port; 31 refers to first one-way valve; 32 refers to second one-way valve; 41 refers to first control valve; 411 refers to first valve housing; 412 refers to first piston; 413 refers to first valve sheet; 414 refers to first ventilation cavity; 415 refers to first valve port; 416 refers to second valve port; 417 refers to third valve port; 42 refers to second control valve; 421 refers to second valve housing; 422 refers to second piston; 423 refers to second valve sheet; 424 refers to second ventilation cavity; 425 refers to fourth valve port; 426 refers to fifth valve port; 427 refers to sixth valve port; 50 refers to sealing plate; 51 refers to first channel; 52 refers to second channel; 53 refers to first shared cavity; 54 refers to second shared cavity; 2 refers to throttle valve; 3 refers to on-off control valve; 4 refers to muffler; 5 refers to water outlet; 100 refers to adsorption tower; 101 refers to first hole; 102 refers to second hole; 103 refers to third hole; 104 refers to fourth hole; and 105 refers to fifth hole.

DETAILED DESCRIPTION

The disclosure will be further described in detail below with reference to the accompanying drawings and non-limiting embodiments.

As shown in FIG. 1 to FIG. 10, and in a non-limiting embodiment, an integrated air inlet and outlet valve includes a valve body 1, the valve body 1 is provided with an air inlet 11, an air outlet 12, an exhaust port 13, a first blowback air inlet 14 and two air path control units, the air path control unit includes a first air inlet and outlet port 21 and a second air inlet and outlet port 22, the first air inlet and outlet port 21 is connected with the air outlet 12 through a first one-way valve 31 which enables air to flow to the air outlet 12 from the first air inlet and outlet port 21 in one direction only, the second air inlet and outlet port 22 is selectively communicated with the air inlet 11 or the exhaust port 13 through a first control valve 41, the exhaust port 13 is provided with an on-off control mechanism, the first blowback air inlet 14 is respectively connected with the first air inlet and outlet port 21 of each air path control unit through a second one-way valve 32 which enables air to flow to the first air inlet and outlet port 21 from the first blowback air inlet 14 in one direction only, and the valve body 1 is further provided with a pressure equalization control assembly capable of controlling the air outlet 12 and the first blowback air inlet 14 to be mutually connected and disconnected.

The integrated air inlet and outlet valve is suitable for air inlet and outlet control of a pressure swing adsorption air path system. When the integrated air inlet and outlet valve is used, the first air inlet and outlet ports 21 and the second air inlet and outlet ports 22 of the two air path control units are respectively and correspondingly connected with two adsorption towers of the pressure swing adsorption air path system, the adsorption tower needing to work is defined as a tower A, the other adsorption tower is defined as a tower B, the air path control unit connected with the tower A is a first air path control unit, and the air path control unit connected with the tower B is a second air path control unit. When the tower A needs adsorption, the first control valve 41 of the first air path control unit communicates the first air inlet and outlet port 21 with the air inlet 11. An air source is introduced through the air inlet 11, and the air may be discharged from the air outlet 12 through the tower A, the first air inlet and outlet port 21, and the one-way valve 31 in turn, so that the adsorption of the tower A can be realized. When the tower B needs regeneration, the first control valve 41 of the second air path control unit communicates the second air inlet and outlet port 22 with the exhaust port 13, regenerated air is introduced from the first blowback air inlet 14, and the regenerated air is discharged from the exhaust port 13 through the second one-way valve 32, the second air inlet and outlet port 22, the tower B and the first air inlet and outlet port 21 of the second air path control unit, so that the blowback regeneration of the tower B can be realized. When pressure equalization is needed after the regeneration of the tower B is sufficient, the pressure equalization control assembly communicates the air outlet 12 with the first blowback air inlet 14. A part of the dry air after being treated by the tower A is introduced to the first blowback air inlet 14, and enters the tower B through the second one-way valve 32 of the second air path control unit. Meanwhile, the exhaust port 13 is turned off by the on-off control mechanism, so that the air entering the tower B cannot be discharged until the pressure in the tower B gradually rises to a working pressure, making preparations for switching to the tower B for working.

According to the integrated air inlet and outlet valve, the first one-way valves 31, the second one-way valves 32, the first control valves 41 and the on-off control mechanisms of the two air path control units are integrally installed on the valve body. Therefore, when the integrated inlet and outlet valve is used in the pressure swing adsorption system, the integrated air inlet and outlet valve has the advantages of greatly reduced connecting pipelines which avoids the problem of redundant pipeline connections, simple installation and maintenance, reduced failure rate, and good aesthetics. Moreover, the integrated inlet and outlet valve has small overall size and small occupied space, which is beneficial to reducing the manufacturing cost. Meanwhile, the integrated air inlet and outlet valve realize the functions of air inlet, air outlet and pressure equalization, and can meet the requirements of the pressure swing adsorption air path system.

In this non-limiting embodiment, the first control valve 41 includes a first valve housing 411, a first piston 412 mounted in the first valve housing 411, a first valve sheet 413 connected with the first piston 412 and a first driving assembly configured for driving the first piston 412 to reciprocate linearly. The first valve housing 411 is detachably installed in an inner cavity provided in the valve body 1 and defines a first ventilation cavity 414, the first ventilation cavity 414 is provided with a first valve port 415 communicated with the second air inlet and outlet port 22, a second valve port 416 communicated with the air inlet 11 and a third valve port 417 communicated with the exhaust port 13. The first valve sheet 413 is located in the first ventilation cavity 414 and is capable of being driven by the first piston 412 reciprocating linearly to selectively seal the second valve port 416 or the third valve port 417. The first control valve 41 is detachably installed in the inner cavity of the valve body 1. The first control valve 41 may be manufactured and assembled separately and then mounted in the valve body 1, which is very simple to manufacture and assemble. Moreover, the first control valve 41 is mounted in the inner cavity of the valve body 1, which is conducive to improving the compactness of the structure. The above-mentioned first driving assembly may be operated in a way that that the first piston 412 is driven by the air source to move unidirectionally and is driven to reset by means of a spring, or may be operated in other existing ways such as a cylinder directly driving the first piston 412 to reciprocate linearly.

In this non-limiting embodiment, the valve body 1 is further provided with a second blowback air inlet 15 connected in parallel with the first blowback air inlet 14 to a blowback air source, the second blowback air inlet 15 is connected with the exhaust port 13 through a second control valve 42, and the second control valve 42 is configured for controlling connection/disconnection of the second blowback air inlet 15 with the exhaust port 13. The second blowback air inlet 15 and the first blowback air inlet 14 are connected in parallel to the blowback air source, and are communicated with each other. During blowback regeneration, the second blowback air inlet 15 and the exhaust port 15 can be disconnected by the second control valve 42, so that the air of the blowback air source only enters the first blowback air inlet 14. During pressure equalization, the second blowback air inlet 15 and the exhaust port 13 can be connected by the second control valve 42, so that the air of the blowback air source can be discharged from the exhaust port 13. As the blowback air source usually comes from tail air of an oxygen-making machine, that is, nitrogen-rich air, which is regenerated air of the oxygen-making machine, and needs to be discharged in time. If the nitrogen-rich air is not discharged in time, it may result in incomplete regeneration of the oxygen-making machine, resulting in the decrease of oxygen concentration, and the like. Therefore, this solution can realize the pressure equalization of the pressure swing adsorption air path system without affecting the discharge of the external nitrogen-rich air.

In this non-limiting embodiment, the second control valve 42 includes a second valve housing 421, a second piston 422 mounted in the second valve housing 421, a second valve sheet 423 connected with the second piston 422 and a second driving assembly configured for driving the second piston 422 to reciprocate linearly. The second valve housing 421 is detachably installed in the inner cavity provided in the valve body 1 and defines a second ventilation cavity 424, the second ventilation cavity 424 is provided with a fourth valve port 425, a fifth valve port 426 and a sixth valve port 427 communicated with the second blowback air inlet 15. The third valve port 417 is communicated with the exhaust port 13 through the fourth valve port 425, the second ventilation cavity 424 and the fifth valve port 426 in turn. The second valve sheet 423 is located in the second ventilation cavity 424 and is capable of being driven by the second piston 422 reciprocating linearly to selectively seal the fourth valve port 425 or the sixth valve port 427, and the second control valve 42 is further used as the on-off control mechanism of the exhaust port 13. The second control valve 42 is detachably installed in the inner cavity of the valve body 1. The second control valve 42 may be manufactured and assembled separately and then mounted in the valve body 1, which is very simple to manufacture and assemble. Moreover, the second control valve 42 is mounted in the inner cavity of the valve body 1, which is conducive to improving the compactness of the structure. The above-mentioned second driving assembly be operated in a way that that the second piston 422 is driven by the air source to move unidirectionally and is driven to reset by means of a spring, or may be operated in other existing ways such as a cylinder directly driving the second piston 422 to reciprocate linearly. The second control valve 42 can selectively seal the fourth valve port 425 or the sixth valve port 427. When the fourth valve port 425 is sealed, the exhaust port 13 is disconnected from the third valve port 417, thus preventing the air from being discharged from the adsorption tower during pressure equalization, and the exhaust port 13 is communicated with the second blowback air inlet 15 at the same time. When the sixth valve port 427 is sealed, the exhaust port 13 is communicated with the third valve port 417, so that the adsorption tower can exhaust air during regeneration, and the exhaust port 13 is disconnected from the second blowback air inlet 15 at the same time. It can be seen that the second control valve 42 has the functions of controlling the connection/disconnection of the second blowback air inlet 15 with the exhaust port 13, and meanwhile, meets the process sequence requirements, which can save the number of valves or control mechanisms, improve the simple and compact structure and reduce the cost.

In this non-limiting embodiment, the valve body 1 is provided with a first hole 101, a second hole 102 and a third hole 103 extending from outside of the valve body 1 to inside of the valve body 1, the valve body 1 is provided with plugs for plugging ends of the first hole 101, the second hole 102 and the third hole 103, the third hole 103 is communicated with the first hole 101 and the second hole 102, the first hole 101 and the second hole 102 are respectively communicated with the first ventilation cavities 414 of the two air path control units correspondingly, a communication port of the first hole 101 and the second hole 102 with the first ventilation cavity 414 is used as the third valve port 417 of the corresponding air path control unit, the third hole 103 is communicated with the second ventilation cavity 424, and a communication port of the third hole 103 with the second ventilation cavity 424 is used as the fourth valve port 425. The mounting structure is convenient to manufacture and assemble.

In this non-limiting embodiment, the valve body 1 is provided with a first channel 51 and a second channel 52 extending across the valve body 1 and arranged side by side, two sealing plates 50 which seal two ends of the first channel 51 and the second channel 52 are detachably mounted on the valve body 1. The valve body 1 is provided with a fourth hole 104 and a fifth hole 105 extending from outside of the valve body 1 to inside of the valve body 1, the fourth hole 104 and the fifth hole 105 are respectively used as the first air inlet and outlet ports 21 of the two air path control units, the fourth hole 104 is communicated with one ends of both the first channel 51 and the second channel 52, and the fifth hole 105 is communicated with the other ends of both the first channel 51 and the second channel 52. The first one-way valves 31 of the two air path control units are mounted in the first channel 51 between the fourth hole 104 and the fifth hole 105 at an interval. The first channel 51 between the first one-way valves 31 of the two air path control units is used as a first shared cavity 53, the air outlet 12 is communicated with the first shared cavity 53. The second one-way valves 32 of the two air path control units are mounted in the second channel 52 between the fourth hole 104 and the fifth hole 105 at an interval, the second channel 52 between the second one-way valves 32 of the two air path control units is used as a second shared cavity 54, and the first blowback air inlet 14 is communicated with the second shared cavity 54. This mounting structure is easy to manufacture and assemble, and forms the first shared cavity 53 which communicates the first one-way valves 31 and the air outlets 12 of the two air path control units, and the second shared cavity 54 which communicates the second one-way valves 32 and the first blowback air inlets 14 of the two air path control units, thus simplifying the air path, reducing the complexity of the air path, and being beneficial to improving the simple and compact structure of the integrated air inlet and outlet valve. The sealing plate 50 is preferably mounted in the valve body 1 by screws, and a sealing ring is arranged between the sealing plate 50 and the valve body 1 to ensure the tightness.

In this non-limiting embodiment, the pressure equalization control assembly includes a ventilation channel connecting the air outlet 12 with the first blowback air inlet 14, and the valve body 1 is provided with a throttle valve 2 located in the ventilation channel and an on-off control valve 3 for controlling on-off of the ventilation channel. Through the on-off control valve 3, the communication and disconnection of the ventilation channel can be controlled, so as to select whether or not to introduce the air which is treated by the adsorption tower and introduced to the air outlet 12 to the first blowback air inlet 14 for pressure equalization. The throttle valve 2 is configured for controlling the pressure and flow of the air.

Preferably, the valve body 1 is provided with the fourth hole 104 extending from outside of the valve body 1 to inside of the valve body 1. The valve body 1 is provided with the plug for plugging the end of the fourth hole 104, and the fourth hole 104 is used as the first blowback air inlet 14. The valve body 1 is provided with the fifth hole 105 extending from outside of the valve body 1 to inside of the valve body 1. The throttle valve 2 and the on-off control valve 3 are mounted in the fifth hole 10, and the on-off control valve 3 plugs the end of the fifth hole 105 at the same time, and the fifth hole 105 communicates the first ventilation cavity 414 with the fourth hole 104. The ventilation channel formed by this structure and the mounting of the throttle valve 2 and the on-off control valve 3 not only make the manufacturing and assembly simple, but also make the whole structure of the integrated inlet and outlet valve simple and compact.

In this non-limiting embodiment, the exhaust port 13 is provided with a muffler 4 and a water outlet 5. The muffler 4 can reduce noises when the air is discharged, and the water outlet 5 can discharge liquid water precipitated from the pressure swing adsorption air path system.

Figure 2:
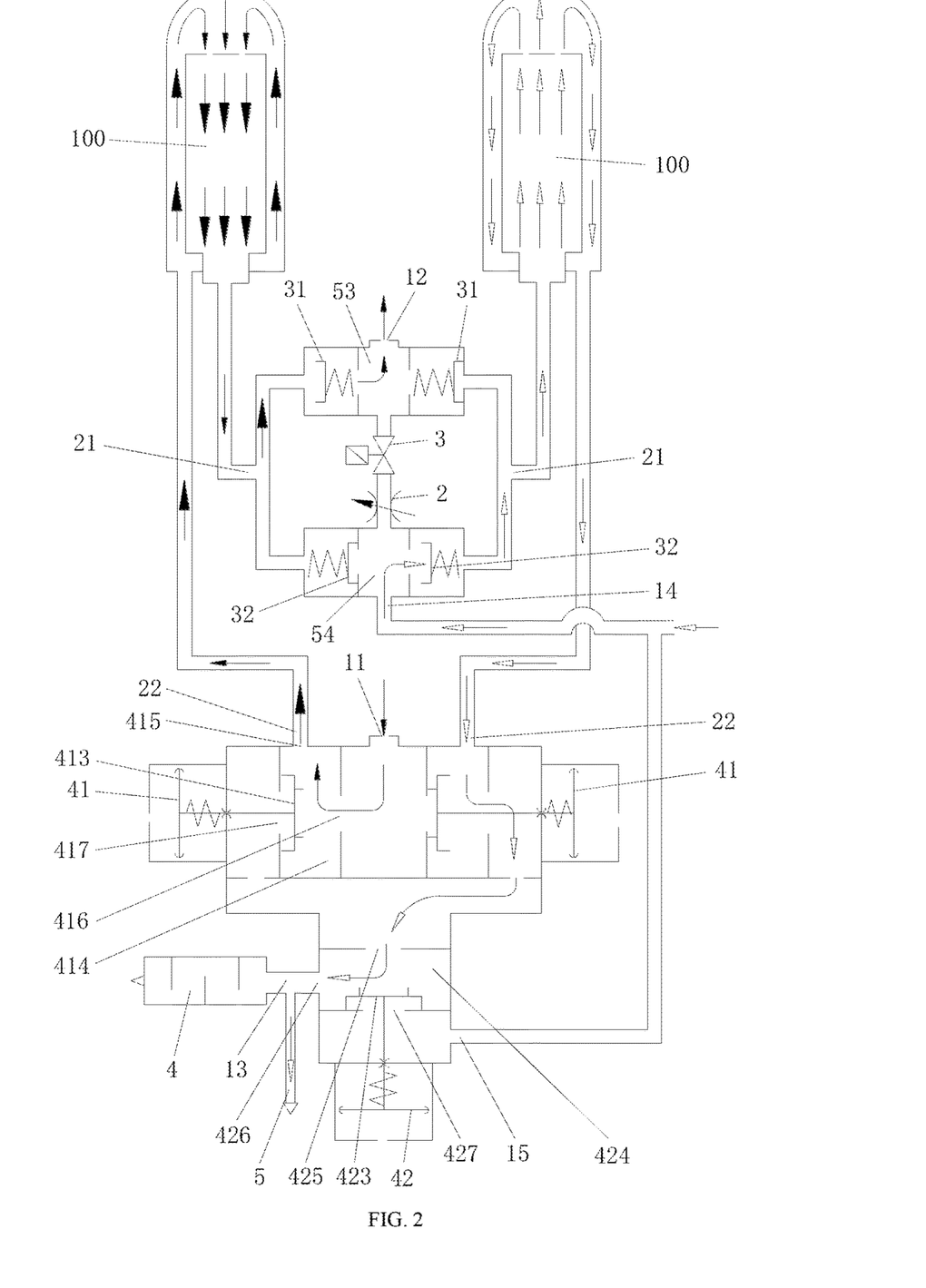
FIG. 2 is a schematic diagram of a pressure swing adsorption air path system according to the principles of the present disclosure.
Figure 3:
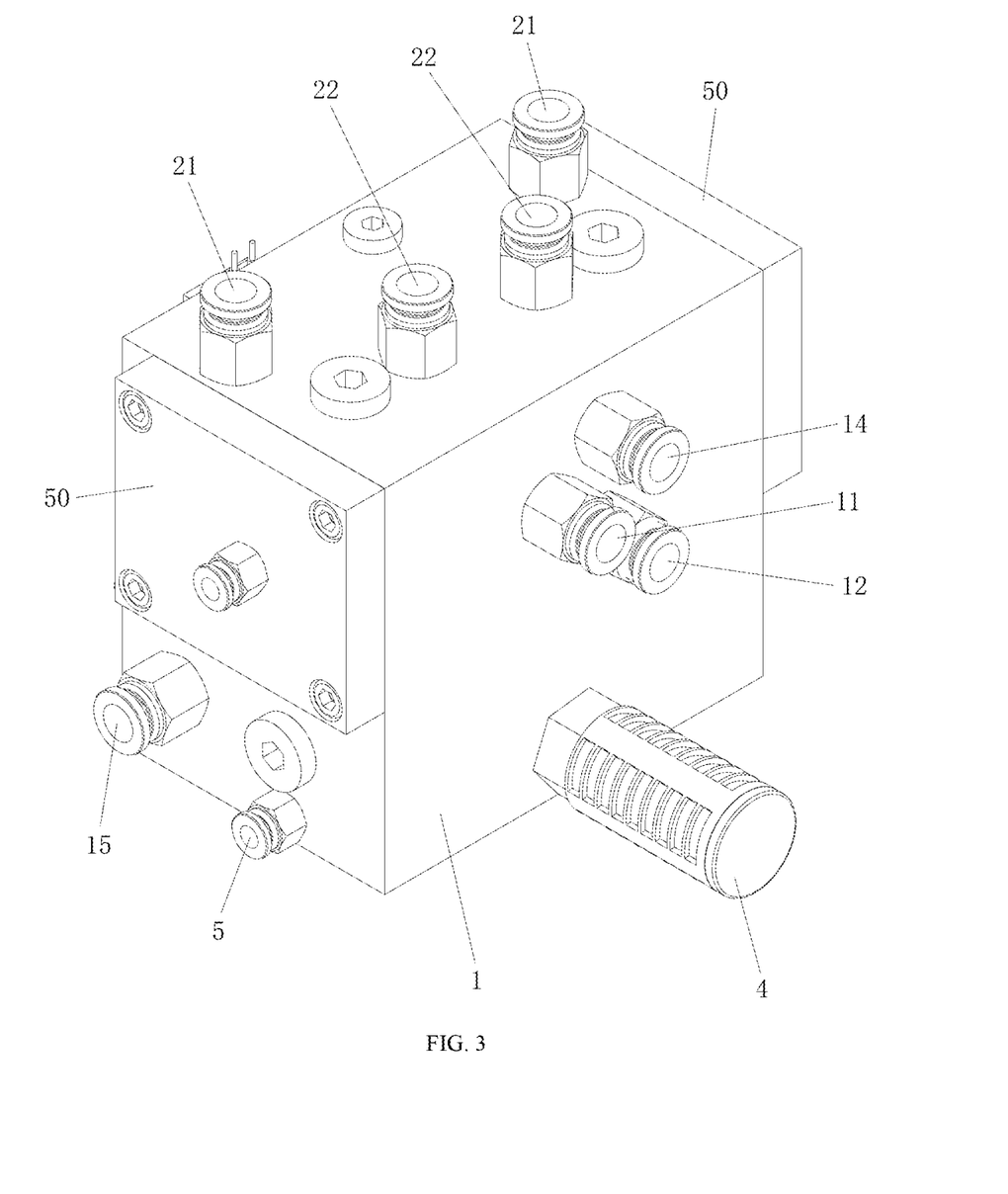
FIG. 3 is a three-dimensional structural schematic diagram of an integrated air inlet and outlet valve according to the principles of the present disclosure.
Figure 4:
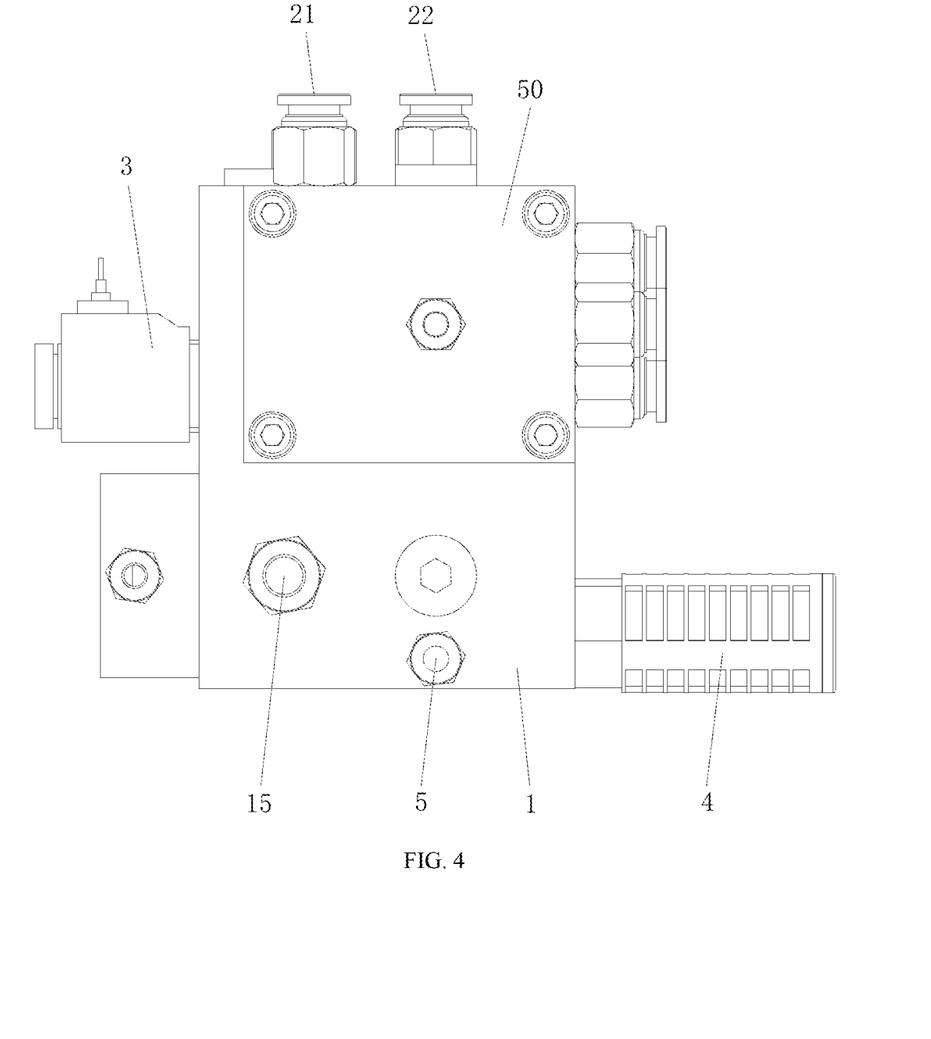
FIG. 4 is a front view of the integrated air inlet and outlet valve of FIG. 3.
Figure 5:
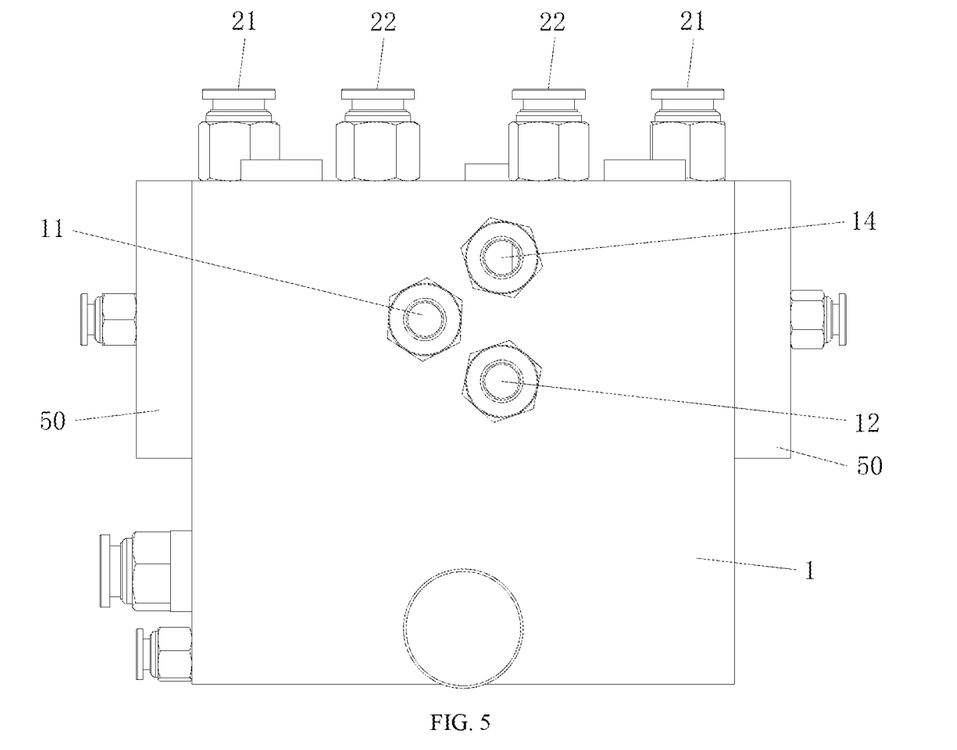
FIG. 5 is a right view of the integrated air inlet and outlet valve of FIG. 3.
Figure 6:
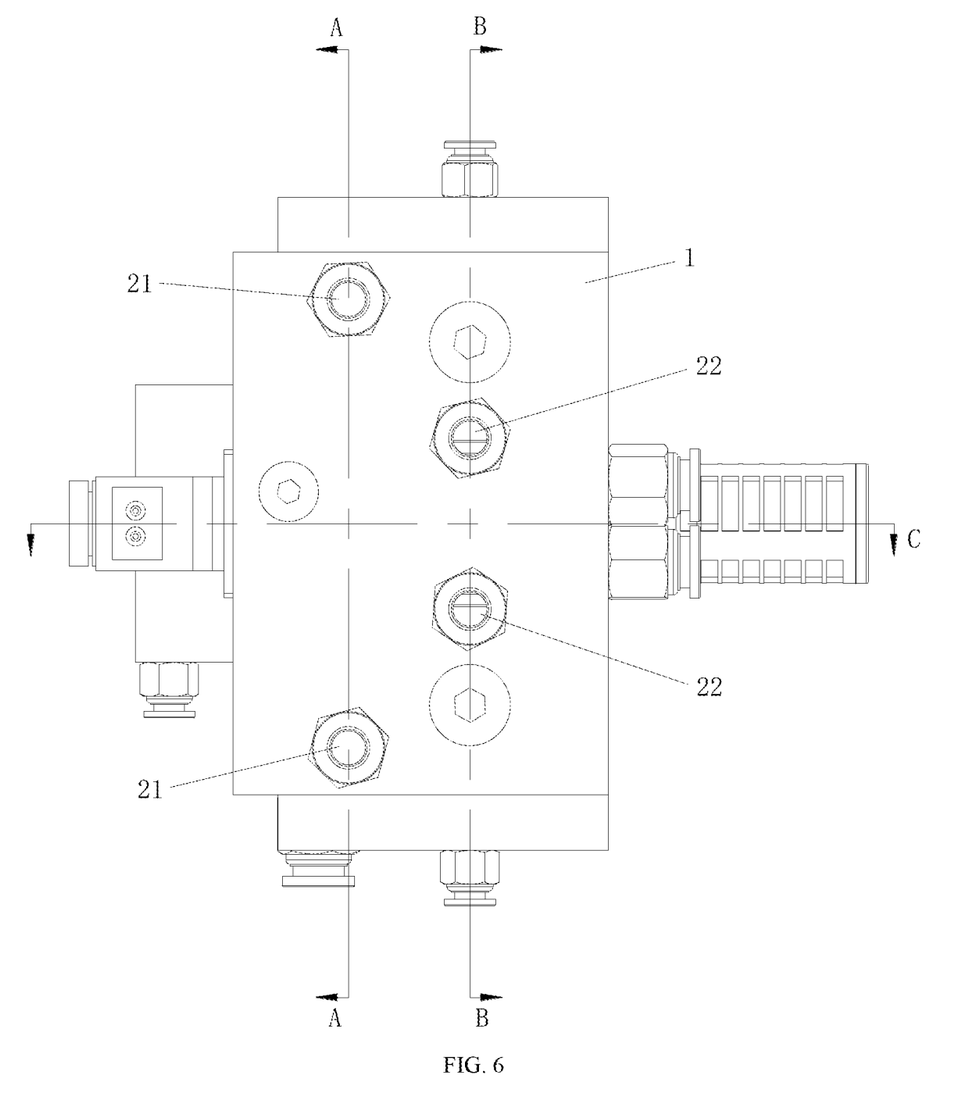
FIG. 6 is a top view of the integrated air inlet and outlet valve of FIG. 3.
Figure 7:
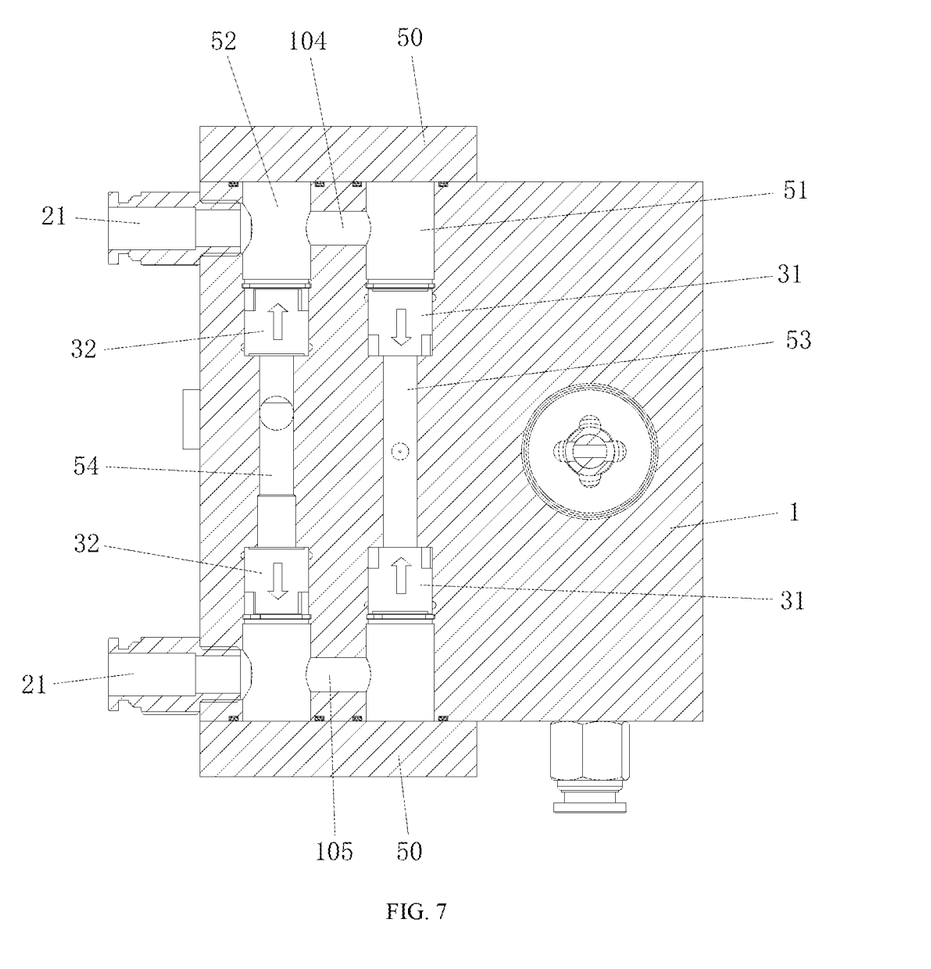
FIG. 7 is a cross-sectional view along line A-A of FIG. 6.
Figure 8:
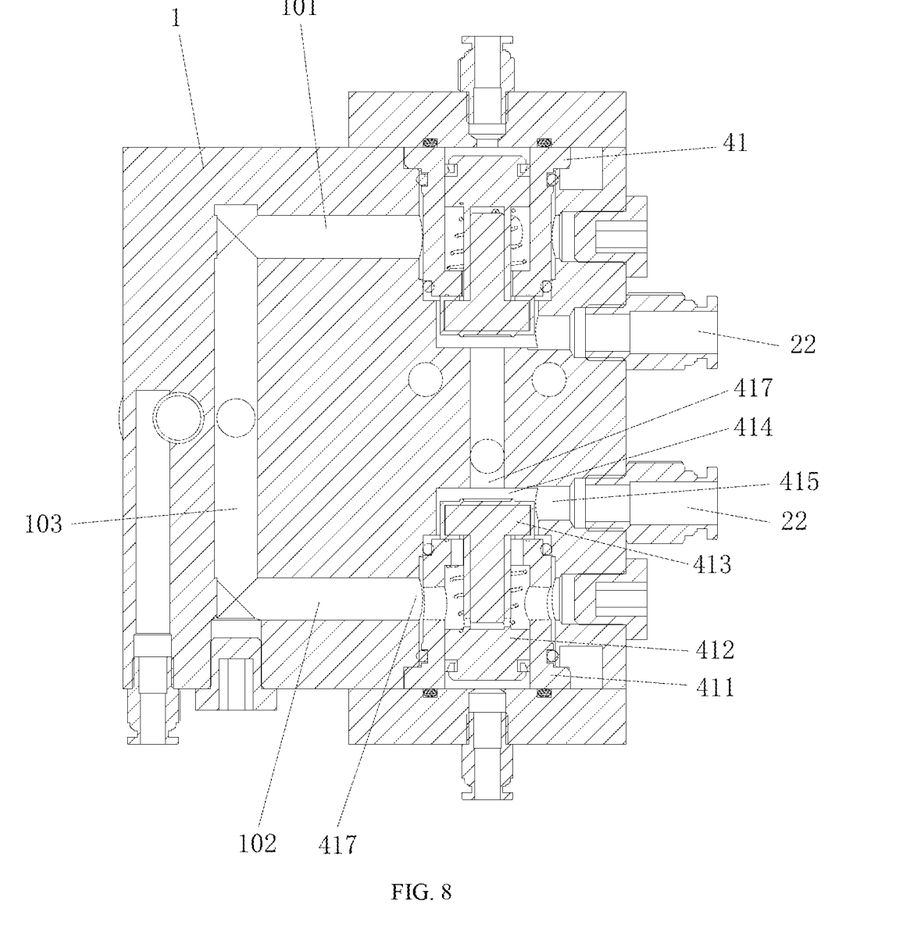
FIG. 8 is a cross-sectional view along line B-B of FIG. 6.
Figure 9:
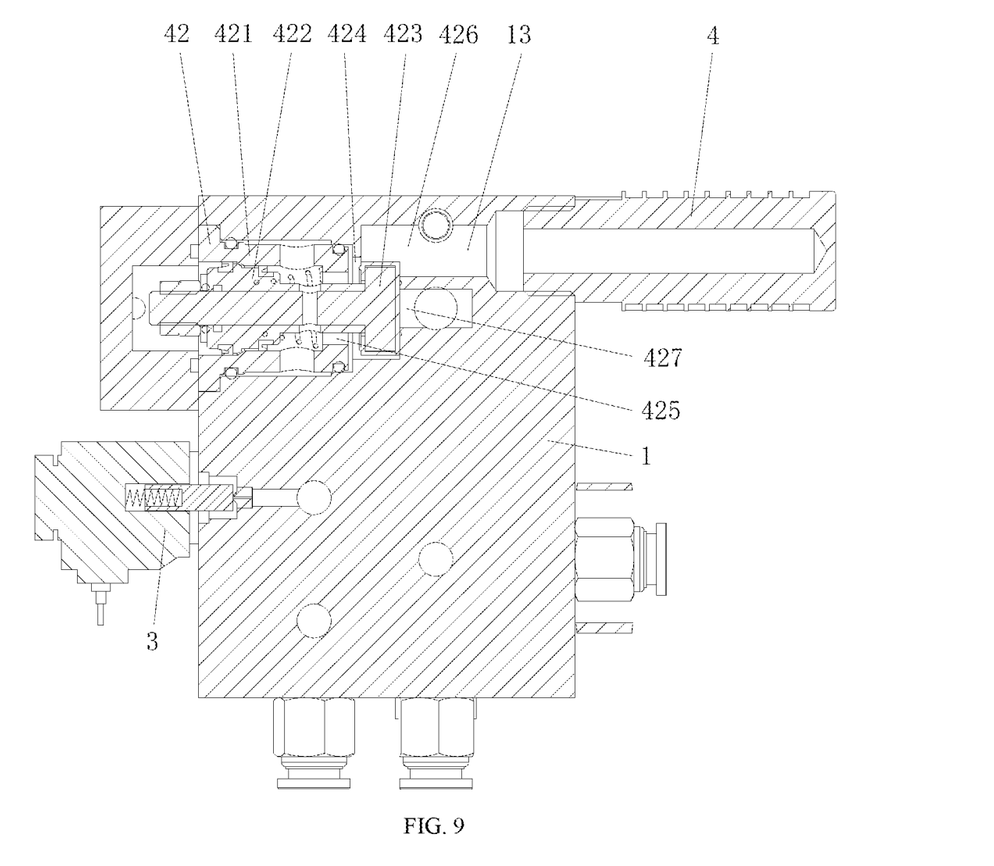
FIG. 9 is a cross-sectional view along line C-C of FIG. 6.
Figure 10:
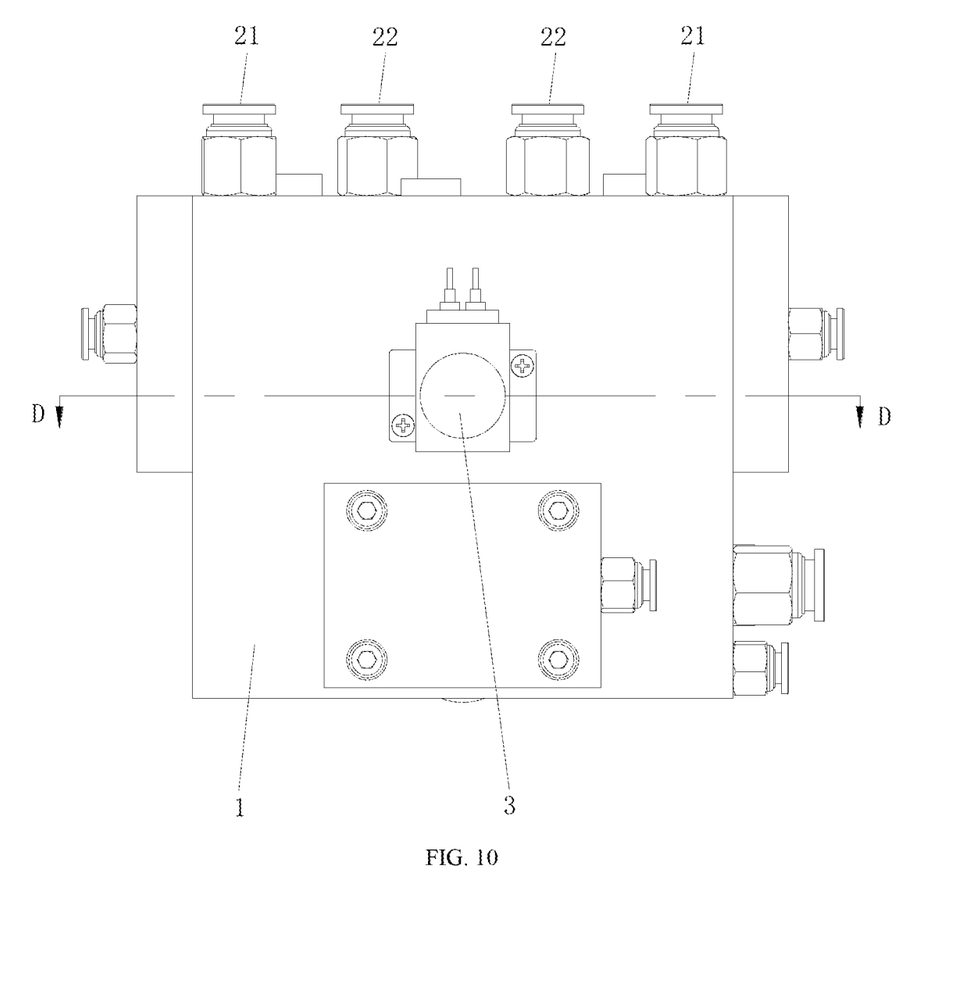
FIG. 10 is a left view of the integrated air inlet and outlet valve of FIG. 3.
Figure 11:
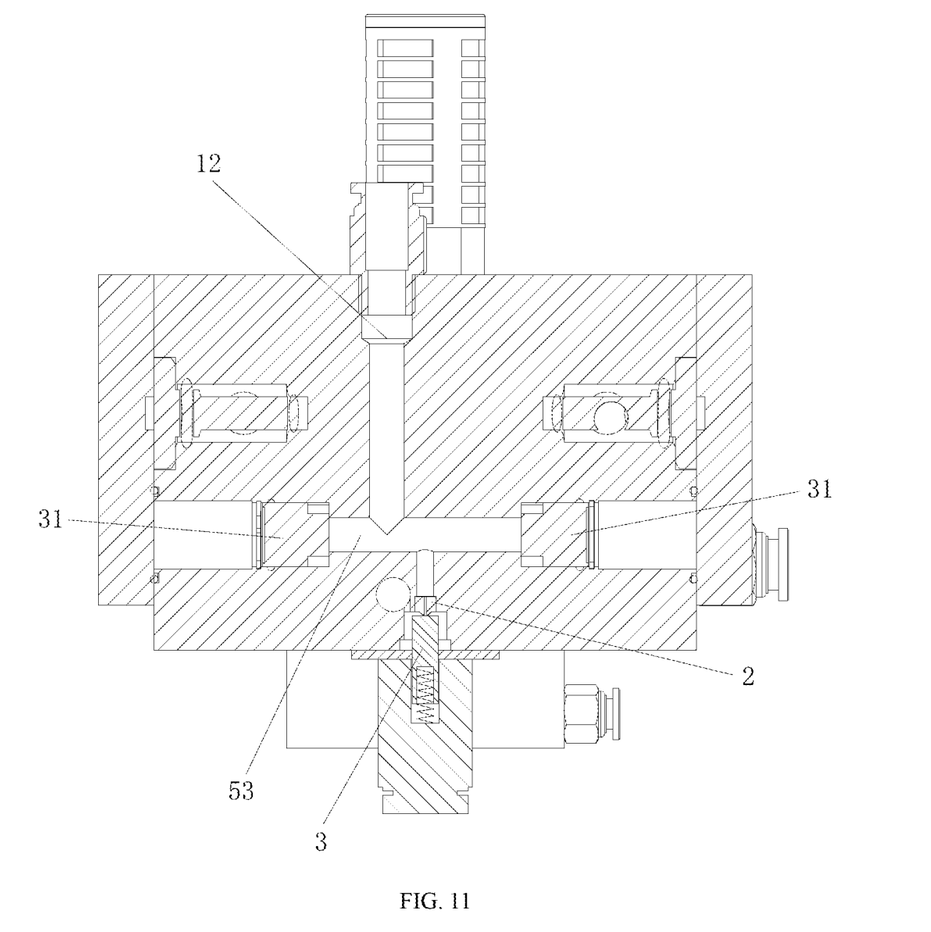
FIG. 11 is a cross-sectional view along line D-D of FIG. 10.

In a non-limiting embodiment, and as shown in FIG. 2, provided is a pressure swing adsorption air path system including two adsorption towers 100, the adsorption tower 100 having two air inlet and outlet ends, and further including the integrated air inlet and outlet valve described above, wherein the first air inlet and outlet ports 21 and the second air inlet and outlet ports 22 of the two air path control units in the integrated air inlet and outlet valve are respectively connected with the two air inlet and outlet ends of the two adsorption towers 100 correspondingly.

As the pressure swing adsorption air path system adopts the integrated inlet and outlet valve of described above, the pressure swing adsorption air path system also has the advantages of the integrated inlet and outlet valve.

In this non-limiting embodiment, the two air inlet and outlet ends of the adsorption tower 100 are located at the same end of the adsorption tower 100. This is beneficial to reduce the overall size and volume of the device and reduce the occupied space.

The above are only the preferred non-limiting embodiments of the disclosure, and the protection scope of the disclosure is not limited to the above embodiments. For those of ordinary skills in the art, the improvements and changes obtained without departing from the technical concept of the disclosure should also be regarded as the protection scope of the disclosure.

What is claimed is:

1. An integrated air inlet and outlet valve, comprising a valve body, wherein the valve body is provided with an air inlet, an air outlet, an exhaust port, a first blowback air inlet and two air path control units, each of the air path control units comprises a first air inlet and outlet port and a second air inlet and outlet port, the first air inlet and outlet port is connected with the air outlet through a first one way valve which enables air to flow to the air outlet from the first air inlet and outlet port in one direction only, the second air inlet and outlet port is selectively communicated with the air inlet; or the exhaust port through a first control valve, the exhaust port is provided with an on-off control mechanism, the first blowback air inlet 4 is respectively connected with the first air inlet and outlet port of each air path control unit through a second one-way valve which enables air to flow to the first air inlet and outlet port; from the first blowback air inlet in one direction only, and the valve body is further provided with a pressure equalization control assembly capable of controlling the air outlet and the first blowback air inlet to be mutually connected and disconnected.

2. The integrated air inlet and outlet valve according to claim 1, wherein the first control valve comprises a first valve housing, a first piston mounted in the first valve housing, a first valve sheet connected with the first piston and a first driving assembly configured for driving the first piston to reciprocate linearly, the first valve housing is detachably installed in an inner cavity provided in the valve body and defines a first ventilation cavity, the first ventilation cavity is provided with a first valve port communicated with the second air inlet and outlet port, a second valve port communicated with the air inlet and a third valve port communicated with the exhaust port, the first valve sheet is located in the first ventilation cavity and is capable of being driven by the first piston reciprocating linearly to selectively seal the second valve port or the third valve port.

3. The integrated air inlet and outlet valve according to claim 2, wherein the valve body is further provided with a second blowback air inlet connected in parallel with the first blowback air inlet to a blowback air source, the second blowback air inlet is connected with the exhaust port through a second control valve, and the second control valve is configured for controlling connection/disconnection of the second blowback air inlet with the exhaust port.

4. The integrated air inlet and outlet valve according to claim 3, wherein the second control valve comprises a second valve housing, a second piston mounted in the second valve housing, a second valve sheet connected with the second piston and a second driving assembly configured for driving the second piston, to reciprocate linearly, the second valve housing is detachably installed in the inner cavity provided in the valve body and defines a second ventilation cavity, the second ventilation cavity is provided with a fourth valve port, a fifth valve port and a sixth valve port communicated with the second blowback air inlet, the third valve port is communicated with the exhaust port through the fourth valve port, the second ventilation cavity and the fifth valve port in turn, the second valve sheet is located in the second ventilation cavity and is capable of being driven by the second piston reciprocating linearly to selectively seal the fourth valve port or the sixth valve port, and the second control valve is further used as the on-off control mechanism of the exhaust port.

5. The integrated air inlet and outlet valve according to claim 4, wherein the valve body is provided with a first hole, a second hole and a third hole extending from outside of the valve body to inside of the valve body, the valve body is provided with plugs for plugging ends of the first hole, the second hole and the third hole, the third hole is communicated with the first hole and the second hole, the first hole and the second hole are respectively communicated with the first ventilation cavities of the two air path control units correspondingly, a communication port of the first hole and the second hole with the first ventilation cavity is used as the third valve port of the corresponding air path control unit, the third hole is communicated with the second ventilation cavity, and a communication port of the third hole with the second ventilation cavity is used as the fourth valve port.

6. The integrated air inlet and outlet valve according to claim 1, wherein the valve body is provided with a first channel and a second channel extending across the valve body and arranged side by side, two sealing plates which seal two ends of the first channel and the second channel are detachably mounted on the valve body, the valve body is provided with a fourth hole and a fifth hole extending from outside of the valve body to inside of the valve body, the fourth hole and the fifth hole, are respectively used as the first air inlet and outlet ports of the two air path control units, the fourth hole is communicated with one ends of both the first channel and the second channel, and the fifth hole is communicated with the other ends of both the first channel and the second channel; the first one-way valves of the two air path control units are mounted in the first channel between the fourth hole and the fifth hole at an interval, the first channel between the first one-way valves of the two air path control units is used as a first shared cavity, the air outlet is communicated with the first shared cavity, the second one-way valves of the two air path control units are mounted in the second channel between the fourth hole and the fifth hole at an interval, the second channel between the second one-way valves of the two air path control units is used as a second shared cavity, and the first blowback air inlet is communicated with the second shared cavity.

7. The integrated air inlet and outlet valve according to claim 1, wherein the pressure equalization control assembly comprises a ventilation channel connecting the air outlet, and the first blowback air inlet, and the valve body is provided with a throttle valve located in the ventilation channel and an on-off control valve for controlling on-off of the ventilation channel.

8. The integrated air inlet and outlet valve according to claim 1, wherein the exhaust port is provided with a muffler and a water outlet.

9. A pressure swing adsorption air path system, comprising two adsorption towers, each of the adsorption towers having two air inlet and outlet ends, wherein the system further comprises the integrated air inlet and outlet valve according to anyone claim 1, the first air inlet and outlet ports and the second air inlet and outlet ports of the two air path control units in the integrated air inlet and outlet valve are respectively connected with the two air inlet and outlet ends of the two adsorption towers correspondingly.

10. The pressure swing adsorption air path system according to claim 9, wherein the two air inlet and outlet ends of the adsorption tower are located at the same end of the adsorption tower.

11. The pressure swing adsorption air path system according to claim 9, wherein the first control valve comprises a first valve housing, a first piston mounted in the first valve housing, a first valve sheet connected with the first piston and a first driving assembly configured for driving the first piston to reciprocate linearly, the first valve housing is detachably installed in an inner cavity provided in the valve body and defines a first ventilation cavity, the first ventilation cavity is provided with a first valve port communicated with the second air inlet and outlet port, a second valve port communicated with the air inlet and a third valve port communicated with the exhaust port, the first valve sheet is located in the first ventilation cavity and is capable of being driven by the first piston reciprocating linearly to selectively seal the second valve port or the third valve port.

12. The pressure swing adsorption air path system according to claim 11, wherein the valve body is further provided with a second blowback air inlet connected in parallel with the first blowback air inlet to a blowback air source, the second blowback air inlet is connected with the exhaust port through a second control valve, and the second control valve is configured for controlling connection/disconnection of the second blowback air inlet with the exhaust port.

13. The pressure swing adsorption air path system according to claim 12, wherein the second control valve comprises a second valve housing, a second piston mounted in the second valve housing, a second valve sheet connected with the second piston and a second driving assembly configured for driving the second piston to reciprocate linearly, the second valve housing is detachably installed in the inner cavity provided in the valve body and defines a second ventilation cavity, the second ventilation cavity is provided with a fourth valve port, a fifth valve port and a sixth valve port communicated with the second blowback air inlet, the third valve port is communicated with the exhaust port through the fourth valve port, the second ventilation cavity and the fifth valve port in turn, the second valve sheet is located in the second ventilation cavity and is capable of being driven by the second piston reciprocating linearly to selectively seal the fourth valve port or the sixth valve port, and the second control valve is further used as the on-off control mechanism of the exhaust port.

14. The pressure swing adsorption air path system according to claim 13, wherein the valve body is provided with a first hole, a second hole and a third hole extending from outside of the valve body to inside of the valve body, the valve body is provided with plugs for plugging ends of the first hole, the second hole and the third hole, the third hole is communicated with the first hole and the second hole, the first hole and the second hole are respectively communicated with the first ventilation cavities of the two air path control units correspondingly, a communication port of the first hole and the second hole with the first ventilation cavity is used as the third valve port of the corresponding air path control unit, the third hole is communicated with the second ventilation cavity, and a communication port of the third hole with the second ventilation cavity is used as the fourth valve port.

15. The pressure swing adsorption air path system according to claim 9, wherein the valve body is provided with a first channel and a second channel extending across the valve body and arranged side by side, two sealing plates which seal two ends of the first channel and the second channel are detachably mounted on the valve body, the valve body is provided with a fourth hole and a fifth hole extending from outside of the valve body to inside of the valve body, the fourth hole and the fifth hole are respectively used as the first air inlet and outlet ports of the two air path control units, the fourth hole is communicated with one ends of both the first channel and the second channel, and the fifth hole is communicated with the other ends of both the first channel and the second channel; the first one-way valves of the two air path control units are mounted in the first channel between the fourth hole and the fifth hole at an interval, the first channel between the first one-way valves of the two air path control units is used as a first shared cavity, the air outlet is communicated with the first shared cavity, the second one-way valves of the two air path control units are mounted in the second channel between the fourth hole and the fifth hole at an interval, the second channel between the second one-way valves of the two air path control units is used as a second shared cavity, and the first blowback air inlet is communicated with the second shared cavity.

16. The pressure swing adsorption air path system according to claim 9, wherein the pressure equalization control assembly comprises a ventilation channel connecting the air outlet and the first blowback air inlet, and the valve body is provided with a throttle valve located in the ventilation channel and an on-off control valve for controlling on-off of the ventilation channel.

17. The pressure swing adsorption air path system according to claim 9, wherein the exhaust port is provided with a muffler and a water outlet.

* * * * *

UNITED STATES PATENT AND TRADEMARK OFFICE
CERTIFICATE OF CORRECTION

PATENT NO. : 12,331,840 B2
APPLICATION NO. : 18/010093
DATED : June 17, 2025
INVENTOR(S) : Gang Huang Page 1 of 1

It is certified that error appears in the above-identified patent and that said Letters Patent is hereby corrected as shown below:

In the Claims

Column 10, Line 24, Claim 1, delete "one way" and insert -- one-way --

Column 10, Line 28, Claim 1, delete "inlet;" and insert -- inlet --

Column 10, Line 30, Claim 1, after "inlet" delete "4"

Column 10, Line 33, Claim 1, delete "port;" and insert -- port --

Column 10, Line 66, Claim 4, delete "piston," and insert -- piston --

Column 11, Line 36, Claim 6, delete "hole," and insert -- hole --

Column 11, Line 55, Claim 7, delete "outlet," and insert -- outlet --

Column 11, Line 67, Claim 9, after "to" delete "anyone"

Signed and Sealed this
Twenty-sixth Day of August, 2025

Coke Morgan Stewart
*Acting Director of the United States Patent and Trademark Office*